(12) United States Patent
Rytter et al.

(10) Patent No.: US 8,952,076 B2
(45) Date of Patent: Feb. 10, 2015

(54) FISCHER-TROPSCH CATALYSTS

(75) Inventors: Erling Rytter, Trondheim (NO); Torild Hulsund Skagseth, Ranheim (NO); Hanne Wigum, Trondheim (NO); Nonyameko Sincadu, Heiderand (ZA)

(73) Assignee: Statoil ASA, Stavanger (NO)

( * ) Notice: Subject to any disclaimer, the term of this patent is extended or adjusted under 35 U.S.C. 154(b) by 0 days.

(21) Appl. No.: 12/582,541

(22) Filed: Oct. 20, 2009

(65) Prior Publication Data

US 2010/0099780 A1 Apr. 22, 2010

Related U.S. Application Data

(62) Division of application No. 10/587,825, filed as application No. PCT/GB2005/000287 on Jan. 27, 2005, now abandoned.

(30) Foreign Application Priority Data

Jan. 28, 2004 (GB) .................................. 0401829.7

(51) Int. Cl.
*C07C 27/00* (2006.01)
*C07C 27/06* (2006.01)
(Continued)

(52) U.S. Cl.
CPC .............. *C10G 47/00* (2013.01); *B01J 21/005* (2013.01); *B01J 23/005* (2013.01); *B01J 23/75* (2013.01); *B01J 23/755* (2013.01); *B01J 23/80* (2013.01); *B01J 23/8896* (2013.01); *B01J 23/8913* (2013.01); *B01J 35/002* (2013.01); *B01J 37/0205* (2013.01); *C10G 2/331* (2013.01); *C10G 2/332* (2013.01); *C10G 2/333* (2013.01);
(Continued)

(58) Field of Classification Search
USPC .......... 518/700, 715; 502/302, 326, 327, 332, 502/334, 339, 355, 415, 439
See application file for complete search history.

(56) References Cited

U.S. PATENT DOCUMENTS

| | | |
|---|---|---|
| 1,746,464 A | 2/1930 | Fischer et al. |
| 2,102,851 A | 12/1937 | La Brie |

(Continued)

FOREIGN PATENT DOCUMENTS

| | | |
|---|---|---|
| EP | 0042471 A1 | 3/1981 |
| EP | 0296726 | 6/1988 |

(Continued)

OTHER PUBLICATIONS

Iglesia et al., "Selectivity Control and Catalyst Design in the Fischer-Tropsch Synthesis: Site, Pellets and Reactors," *Advances in Catalysis*, vol. 3 (1993).

(Continued)

*Primary Examiner* — Cam N Nguyen
(74) *Attorney, Agent, or Firm* — Patterson Thuente Pedersen, P.A.

(57) ABSTRACT

A method of producing an alumina-supported catalyst for use in a Fischer-Tropsch synthesis reaction, which comprises: calcining an initial γ-alumina support material at a temperature of at least 550° C. to produce a modified alumina support material; impregnating the modified alumina support material with a source cobalt; calcining the impregnated support material at a temperature of 700° C. to 1200° C., and activating the catalyst.

20 Claims, 1 Drawing Sheet

(51) Int. Cl.

| | | |
|---|---|---|
| *B01J 23/00* | (2006.01) | |
| *B01J 23/02* | (2006.01) | |
| *B01J 23/08* | (2006.01) | |
| *B01J 23/10* | (2006.01) | |
| *B01J 23/40* | (2006.01) | |
| *B01J 23/42* | (2006.01) | |
| *B01J 23/44* | (2006.01) | |
| *B01J 23/56* | (2006.01) | |
| *B01J 20/00* | (2006.01) | |
| *B01J 21/04* | (2006.01) | |
| *C10G 47/00* | (2006.01) | |
| *B01J 21/00* | (2006.01) | |
| *B01J 23/75* | (2006.01) | |
| *B01J 23/755* | (2006.01) | |
| *B01J 23/80* | (2006.01) | |
| *B01J 23/889* | (2006.01) | |
| *B01J 23/89* | (2006.01) | |
| *B01J 35/00* | (2006.01) | |
| *B01J 37/02* | (2006.01) | |
| *C10G 2/00* | (2006.01) | |
| *C10G 45/58* | (2006.01) | |
| *B01J 23/36* | (2006.01) | |
| *B01J 23/83* | (2006.01) | |
| *B01J 35/10* | (2006.01) | |

(52) U.S. Cl.
CPC ............... *C10G 2/342* (2013.01); *C10G 45/58* (2013.01); *B01J 23/36* (2013.01); *B01J 23/83* (2013.01); *B01J 23/892* (2013.01); *B01J 35/1014* (2013.01); *B01J 35/109* (2013.01); *B01J 37/0207* (2013.01); *C10G 2300/703* (2013.01)
USPC ........... 518/700; 518/715; 502/302; 502/326; 502/327; 502/332; 502/334; 502/339; 502/355; 502/415; 502/439

(56) References Cited

U.S. PATENT DOCUMENTS

| | | | |
|---|---|---|---|
| 2,548,159 A | 4/1951 | Houtman et al. | |
| 2,666,756 A | 1/1954 | Thomas et al. | |
| 2,830,877 A | 4/1958 | Appell | |
| 2,916,356 A | 12/1959 | Keith et al. | |
| 2,982,793 A | 5/1961 | Turner et al. | |
| 2,987,487 A | 6/1961 | Stevens et al. | |
| 3,025,248 A | 3/1962 | Rosinski | |
| 3,068,303 A | 12/1962 | Pattison | |
| 3,108,888 A | 10/1963 | Bugosh | |
| 3,141,742 A | 7/1964 | Dye et al. | |
| 3,235,515 A | 2/1966 | Earl | |
| 3,270,059 A | 8/1966 | Winderl et al. | |
| 3,331,787 A | 7/1967 | Keith et al. | |
| 3,344,196 A | 9/1967 | Hubert et al. | |
| 3,397,154 A | 8/1968 | Herbert | |
| 3,403,111 A | 9/1968 | Colgan et al. | |
| 3,407,149 A | 10/1968 | Taylor et al. | |
| 3,423,194 A | 1/1969 | Kearby | |
| 3,437,586 A | 4/1969 | Weisz | |
| 3,441,251 A | 4/1969 | Burns | |
| 3,565,830 A | 2/1971 | Keith et al. | |
| 3,591,649 A | 7/1971 | Kroll et al. | |
| 3,692,701 A | 9/1972 | Box, Jr. | |
| 3,751,508 A * | 8/1973 | Fujiso et al. | 585/262 |
| 3,825,504 A | 7/1974 | Hilfman | |
| 3,840,471 A | 10/1974 | Acres | |
| 3,853,790 A * | 12/1974 | Vosolsobe et al. | 502/324 |
| 3,876,557 A | 4/1975 | Bland | |
| 3,881,696 A | 5/1975 | Lepeytre et al. | |
| 3,883,444 A | 5/1975 | Maselli et al. | |
| 3,933,883 A | 1/1976 | Parthasarathy et al. | |
| 3,966,640 A | 6/1976 | Katz et al. | |
| 3,988,263 A | 10/1976 | Hansford | |
| 4,049,582 A * | 9/1977 | Erickson et al. | 502/306 |
| 4,055,513 A * | 10/1977 | Wheelock | 502/303 |
| 4,065,484 A | 12/1977 | Dobashi | |
| 4,080,390 A | 3/1978 | Imamura | |
| 4,088,608 A | 5/1978 | Tanaka et al. | |
| 4,102,777 A | 7/1978 | Wheelock | |
| 4,102,822 A | 7/1978 | Mulaskey | |
| 4,191,664 A | 3/1980 | McArthur | |
| 4,200,552 A | 4/1980 | Noguchi et al. | |
| 4,219,444 A | 8/1980 | Hill et al. | |
| 4,233,186 A * | 11/1980 | Duprez et al. | 502/327 |
| 4,237,030 A | 12/1980 | Noguchi et al. | |
| 4,247,730 A | 1/1981 | Brunelle | |
| 4,285,837 A | 8/1981 | Sato et al. | |
| 4,368,142 A | 1/1983 | Frohning et al. | |
| 4,440,956 A | 4/1984 | Couvillion | |
| 4,454,207 A | 6/1984 | Fraioli et al. | |
| 4,456,703 A | 6/1984 | Aldridge | |
| 4,499,209 A | 2/1985 | Hoek et al. | |
| 4,539,310 A | 9/1985 | Leftin et al. | |
| 4,585,798 A | 4/1986 | Beuther et al. | |
| 4,595,703 A | 6/1986 | Payne et al. | |
| 4,610,975 A | 9/1986 | Baker et al. | |
| 4,613,624 A | 9/1986 | Beuther et al. | |
| 4,626,521 A | 12/1986 | Murib | |
| 4,670,414 A | 6/1987 | Kobylinski et al. | |
| 4,717,702 A | 1/1988 | Beuther et al. | |
| 4,729,981 A | 3/1988 | Kobylinski et al. | |
| 4,801,573 A | 1/1989 | Eri et al. | |
| 4,801,620 A | 1/1989 | Fujitani et al. | |
| 4,857,559 A | 8/1989 | Eri et al. | |
| 4,870,044 A | 9/1989 | Kukes et al. | |
| 4,880,763 A | 11/1989 | Eri et al. | |
| 4,888,316 A | 12/1989 | Gardner et al. | |
| 4,895,816 A | 1/1990 | Gardner et al. | |
| 4,957,896 A | 9/1990 | Matsumoto et al. | |
| 4,968,660 A | 11/1990 | Tijburg et al. | |
| 4,977,126 A | 12/1990 | Mauldin et al. | |
| 4,985,387 A | 1/1991 | Prigent et al. | |
| 4,988,661 A | 1/1991 | Arai et al. | |
| 5,037,792 A * | 8/1991 | Luck | 502/307 |
| 5,100,859 A | 3/1992 | Gerdes et al. | |
| 5,102,851 A | 4/1992 | Eri et al. | |
| 5,110,780 A | 5/1992 | Peters | |
| 5,116,801 A * | 5/1992 | Luck | 502/307 |
| 5,116,879 A | 5/1992 | Eri et al. | |
| 5,268,091 A | 12/1993 | Boitiaux et al. | |
| 5,380,697 A | 1/1995 | Matusz et al. | |
| 5,552,363 A | 9/1996 | Pannell et al. | |
| 5,565,092 A | 10/1996 | Pannell et al. | |
| 5,565,400 A | 10/1996 | Holmgren | |
| 5,639,798 A | 6/1997 | Wilson et al. | |
| 5,744,419 A | 4/1998 | Choudhary et al. | |
| 5,851,948 A | 12/1998 | Chuang et al. | |
| 5,856,263 A | 1/1999 | Bhasin et al. | |
| 5,874,381 A | 2/1999 | Bonne et al. | |
| 5,965,481 A | 10/1999 | Durand et al. | |
| 5,977,012 A | 11/1999 | Kharas et al. | |
| 6,019,954 A | 2/2000 | Tang et al. | |
| 6,022,755 A | 2/2000 | Kinnari et al. | |
| 6,069,111 A | 5/2000 | Yamamoto et al. | |
| 6,075,062 A | 6/2000 | Zennaro et al. | |
| 6,100,304 A * | 8/2000 | Singleton et al. | 518/715 |
| 6,211,255 B1 * | 4/2001 | Schanke et al. | 518/715 |
| 6,235,798 B1 | 5/2001 | Roy et al. | |
| 6,255,358 B1 * | 7/2001 | Singleton et al. | 518/715 |
| 6,262,132 B1 | 7/2001 | Singleton et al. | |
| 6,271,432 B2 * | 8/2001 | Singleton et al. | 585/700 |
| 6,284,217 B1 * | 9/2001 | Wang et al. | 423/651 |
| 6,365,544 B2 | 4/2002 | Herron et al. | |
| 6,465,530 B2 * | 10/2002 | Roy-Auberger et al. | 518/715 |
| 6,472,441 B1 * | 10/2002 | Kibby | 518/715 |
| 6,486,220 B1 | 11/2002 | Wright | |
| 6,486,221 B2 | 11/2002 | Lapidus et al. | |
| 6,515,035 B2 * | 2/2003 | Roy-Auberger et al. | 518/715 |
| 6,537,945 B2 | 3/2003 | Singleton et al. | |
| 6,596,667 B2 | 7/2003 | Bellussi et al. | |

(56) References Cited

U.S. PATENT DOCUMENTS

| | | |
|---|---|---|
| 6,596,781 B1 | 7/2003 | Schinski |
| 6,649,803 B2* | 11/2003 | Mart et al. ............... 585/734 |
| 6,689,819 B2 | 2/2004 | Roy-Auberger et al. |
| 6,696,502 B1* | 2/2004 | Mart et al. ............... 518/709 |
| 6,734,137 B2* | 5/2004 | Wang et al. .............. 502/328 |
| 6,780,817 B1 | 8/2004 | Koyama et al. |
| 6,800,664 B1* | 10/2004 | Espinoza et al. .......... 518/706 |
| 6,818,589 B1 | 11/2004 | Gillespie et al. |
| 6,822,008 B2* | 11/2004 | Srinivasan et al. ........ 518/717 |
| 6,825,237 B2* | 11/2004 | Schweitzer et al. ....... 518/715 |
| 6,835,690 B2 | 12/2004 | Van Berge et al. |
| 6,835,756 B2* | 12/2004 | Newton et al. ........... 518/712 |
| 6,927,190 B2 | 8/2005 | Lok et al. |
| 6,958,310 B2* | 10/2005 | Wang et al. .............. 502/327 |
| 7,012,103 B2* | 3/2006 | Espinoza et al. .......... 518/706 |
| 7,012,104 B2* | 3/2006 | Espinoza et al. .......... 518/715 |
| RE39,073 E* | 4/2006 | Herbolzheimer et al. .... 518/700 |
| 7,022,644 B2 | 4/2006 | Foong et al. |
| 7,041,866 B1 | 5/2006 | Gillespie |
| 7,045,554 B2* | 5/2006 | Raje et al. ............... 518/709 |
| 7,067,562 B2* | 6/2006 | Espinoza et al. .......... 518/721 |
| 7,071,239 B2* | 7/2006 | Ortego et al. ............ 518/715 |
| 7,078,439 B2* | 7/2006 | Odueyungbo et al. ...... 518/700 |
| 7,097,786 B2* | 8/2006 | Dindi et al. .............. 252/373 |
| 7,163,963 B2 | 1/2007 | Fraenkel |
| 7,226,574 B2* | 6/2007 | Long et al. .............. 423/650 |
| 7,230,035 B2* | 6/2007 | Espinoza et al. .......... 518/703 |
| 7,253,136 B2 | 8/2007 | Mauldin et al. |
| 7,256,154 B2 | 8/2007 | Moon et al. |
| 7,276,540 B2* | 10/2007 | Espinoza et al. .......... 518/715 |
| 7,341,976 B2* | 3/2008 | Espinoza et al. .......... 502/327 |
| 7,351,393 B1 | 4/2008 | Bayense et al. |
| 7,351,679 B2 | 4/2008 | Eri et al. |
| 7,361,626 B2 | 4/2008 | Baijense et al. |
| 7,365,040 B2 | 4/2008 | Van Berge et al. |
| 7,402,612 B2* | 7/2008 | Jin et al. ................. 518/713 |
| 7,417,073 B2* | 8/2008 | Mauldin et al. ........... 518/715 |
| 7,422,995 B2 | 9/2008 | Baijense et al. |
| 7,452,844 B2 | 11/2008 | Hu et al. |
| 7,473,667 B2 | 1/2009 | Hagemeyer et al. |
| 7,541,310 B2 | 6/2009 | Espinoza et al. |
| 8,143,186 B2 | 3/2012 | Rytter |
| 8,324,128 B2 | 12/2012 | Rytter et al. |
| 2001/0031793 A1* | 10/2001 | Singleton et al. ......... 518/715 |
| 2001/0032965 A1* | 10/2001 | Wang et al. .............. 252/373 |
| 2001/0051588 A1 | 12/2001 | Herron et al. |
| 2002/0028853 A1 | 3/2002 | Manzer et al. |
| 2002/0094932 A1 | 7/2002 | Faber et al. |
| 2002/0131914 A1 | 9/2002 | Sung |
| 2002/0172642 A1* | 11/2002 | Dindi et al. .............. 423/651 |
| 2003/0119668 A1 | 6/2003 | Lok et al. |
| 2003/0158037 A1 | 8/2003 | Foong et al. |
| 2004/0054016 A1 | 3/2004 | Lu et al. |
| 2004/0077737 A1 | 4/2004 | Eri et al. |
| 2004/0110852 A1* | 6/2004 | Srinivasan et al. ........ 518/715 |
| 2004/0127585 A1 | 7/2004 | Raje |
| 2004/0138060 A1 | 7/2004 | Rapier et al. |
| 2004/0138317 A1* | 7/2004 | Xie et al. ................. 518/703 |
| 2004/0180784 A1 | 9/2004 | Hagemeyer et al. |
| 2004/0204506 A1 | 10/2004 | Mauldin et al. |
| 2005/0184009 A1 | 8/2005 | Jansen et al. |
| 2005/0245621 A1 | 11/2005 | Baijense et al. |
| 2005/0272827 A1 | 12/2005 | Lok |
| 2006/0009352 A1 | 1/2006 | Zhao et al. |
| 2006/0167119 A1 | 7/2006 | Leng et al. |
| 2006/0223693 A1 | 10/2006 | Fujimoto et al. |
| 2007/0099797 A1 | 5/2007 | Hu et al. |
| 2007/0161714 A1 | 7/2007 | Rytter et al. |
| 2008/0064770 A1 | 3/2008 | Rytter et al. |
| 2008/0255256 A1 | 10/2008 | Rytter |
| 2010/0022388 A1 | 1/2010 | Soled et al. |
| 2010/0022670 A1 | 1/2010 | Soled et al. |
| 2010/0029792 A1 | 2/2010 | Diehl et al. |
| 2010/0184872 A1 | 7/2010 | Eri et al. |

FOREIGN PATENT DOCUMENTS

| | | |
|---|---|---|
| EP | 313375 A | 4/1989 |
| EP | 690119 A1 | 6/1994 |
| EP | 1129776 A1 | 5/2001 |
| EP | 0736326 B1 | 8/2001 |
| EP | 1445018 | 8/2004 |
| GB | 1183201 | 3/1970 |
| GB | 2 053 712 | 2/1981 |
| GB | 2258826 | 2/1993 |
| JP | 58 139744 A | 8/1983 |
| JP | 2003024786 | 1/2003 |
| WO | WO 93/12879 | 7/1993 |
| WO | WO96/00613 | 1/1996 |
| WO | WO99/42214 | 8/1999 |
| WO | WO99/61143 | 12/1999 |
| WO | WO00/20116 | 4/2000 |
| WO | WO00/25918 | 5/2000 |
| WO | WO01/36352 | 5/2001 |
| WO | WO01/62381 | 8/2001 |
| WO | WO02/02229 | 1/2002 |
| WO | WO 02/47816 | 6/2002 |
| WO | WO02/089978 | 11/2002 |
| WO | WO 03/002252 | 1/2003 |
| WO | WO 2004/035193 | 4/2004 |
| WO | WO2005/060448 | 7/2005 |
| WO | WO2005/072866 | 8/2005 |
| WO | WO2006/010936 | 2/2006 |
| WO | WO2006/067285 | 6/2006 |
| WO | WO2007/093825 | 8/2007 |
| WO | WO2009/118372 | 10/2009 |

OTHER PUBLICATIONS

Jacobs et al., "Fischer-Tropsch synthesis XAFS XAFS studies of the effect of water on a Pt-promoted Co/$Al_2O_3$ catalyst," *Applied Catalysis*, 247:335-343 (2003).

Saib et al., "Silica supported cobalt Fischer-Tropsch catalysts: effect of pore diameter of support," *Catalysis Today*, 71:395-402 (2002).

International Search Report for International Application No. PCT/GB2008/000300 dated Jul. 25, 2008.

Betancourt, P et al., "A Study of the Ruthenium-Alumina System", Applied Catalysis A: General. vol. 170, pp. 307-314 (1998).

Van De Loosdrecht et al., "Calcination of Co-based Fischer-Tropsch Synthesis Catalysts," Topics of Catalysis, vol. 26, Nos. 1-4, pp. 121-127. (Dec. 2003).

Borg, Øyvind et al., "Effect of Calcination Atmosphere and Temperature on y-$Al_2O_3$ Supported Colbalt Fischer-Tropsch Catalysts," Topics in Catalysis, vol. 45, Nos. 1-4, pp. 39-43 (Aug. 2007).

Schulz, "Major and Minor Reactions in Fischer-Tropsch Synthesis on Colbalt Catalysts" Topics in Catalysis, 26 91-4): 73-85 (2003).

Li Fan et al., Supercritical-phase Process for Selective Synthesis of Wax from Syngas: Catalyst and Process Development. Catalysis Today, 36:295-306/ 1997.

ASTM Standard D4058-96, 2001, "Standard Test Method for Attrition and Abrasion of Catalysts and Catalyst Carriers", ASTM Int'l. West Conshohoken, PA. Viewed on Feb. 19, 2009 at http://www.astm.org/DATABASE.CART/HISTORICAL/D4058-96R01.htm.

International Search Report for International Application No. PCT/GB2005/003675 dated Dec. 9, 2005 and GB0421242.9. dated Aug. 17, 2005.

International Search Report for International Application No. PCT/GB2005/000287 dated May 18, 2005 and GB0401829.7 dated May 6, 2005.

Tang et al., "Partial Oxidation of Methane of Synthesis Gas Over Alpha-AL203-Supported Bimetallic PT-CO Catalysts", Catalysis Letters, Baltzer, Scientific Publ. Basel, CH. vol. 59, No. 2/4. Jun. 1999. pp. 129-135.

Oukaci et al., "Comparison of patented Co. F-T catalysts using fixed-bed and slurry bubble column reactors" Applied Catalysis A: General Elsevier Scienc, Amsterdamn, NL, vol. 186, No. 1-2. Oct. 4, 1999, pp. 120-144.

Iglesia et al., "Reactions-Transport Selectivity Models and the Design of Fischer-Tropsch Catalysts," Computer-Aided Design of Catalysts, Edited by Becker and Pereira. Ch. 7. pp. 199-257. 1993.

(56) References Cited

OTHER PUBLICATIONS

Application and File History for U.S. Appl. No. 10/433,846, filed Nov. 10, 2003, inventors Eri et al.

Application and File History for U.S. Appl. No. 10/535,066, filed Mar. 15, 2006, inventors Rytter et al.

Application and File History for U.S. Appl. No. 10/587,825, filed Feb. 2, 2007 inventors Rytter et al.

Application and File History for U.S. Appl. No. 11/663,663, filed Feb. 14, 2008, inventor Rytter.

Application and File History for U.S. Appl. No. 12/525,070, filed Mar. 26, 2010, inventors Eri et al.

Application and File History for U.S. Appl. No. 13/378,581, filed Dec. 15, 2011, inventors Rytter et al.

Compressed Air and Gas Institute (What is Clean, Dry Air?) TAP #106, published Nov. 1, 2005.

Stevens et al., Qatar Fertilizer Company, in the proceedings of Nitrogen + Syngas 2008 conference conducted in Moscow, pp. 20-23. Apr. 2008.

Catalyst Handbook, 2nd edition, M.V. Twigg, editor Wolfe Publishing, London 1989. pp. 77-81.

Luo et al., "Fischer-Tropsch Synthesis: Group II alkali-earth metal promoted catalysts", Applied Catalysis. pp. 171-181 (2003).

Madikizela et al. Applied Catalysis A: General 272 (2004) 339-346).

International Search Report for International Application No. PCT/GB2010/002111 dated May 25, 2012.

International Search Report for International Application No. PCT/GB01/05461 dated Mar. 1, 2002.

International Search Report for International Application No. PCT/GB03/04873 dated Mar. 25, 2004.

International Search Report for International Application No. PCT/GB2010/001647 dated Nov. 2, 2010.

Application and File History for U.S. Appl. No. 13/510,867, filed Sep. 24, 2012, inventors Rytter et al.

Taylor, "An Introduction to Error Analysis", 2nd Ed. (1997). 329 pages. Chs. 1 and 2 provided.

\* cited by examiner

FISCHER-TROPSCH CATALYSTS

RELATED APPLICATIONS

This application is a division of application Ser. No. 10/587,825 filed Feb. 2, 2007, which in turn is a National Phase entry of PCT Application No. PCT/GB2005/000287, filed Jan. 27, 2005, which claims priority from GB Application Number 0401829.7 filed Jan. 28, 2004, the disclosures of which are hereby incorporated by reference herein in their entirety.

FIELD OF THE INVENTION

The present invention relates to supported catalysts and their use in Fischer-Tropsch synthesis reactions, and more specifically to processes for the production of the catalyst and support, and to the catalyst and support themselves.

BACKGROUND OF THE INVENTION

Conversion of natural gas to liquid hydrocarbons ("Gas To Liquids" or "GTL" process) is based on a 3 step procedure consisting of: 1) synthesis gas production; 2) synthesis gas conversion by FT synthesis; and 3) upgrading of FT products (wax and naphtha/distillates) to final products.

The Fischer-Tropsch reaction for conversion of synthesis gas, a mixture of CO and hydrogen, possibly also containing essentially inert components like $CO_2$, nitrogen and methane, is commercially operated over catalysts containing the active metals Fe or Co. Iron catalysts are best suited for synthesis gas with low H2/CO ratios (<1.2), e.g. from coal or other heavy hydrocarbon feedstock, where this ratio is considerably lower than the consumption ratio of the FT-reaction (2.0-2.1). The present invention is concerned with Co-based catalysts, in particular, supported Co-based catalysts. A variety of products can be made by the FT-reaction, but from supported cobalt, the primary product is long-chain hydrocarbons that can be further upgraded to products like diesel fuel and petrochemical naphtha. Byproducts can include olefins and oxygenates.

To achieve sufficient catalytic activity, it is customary to disperse the Co on a catalyst carrier, often referred to as the support material. In this way, a larger portion of Co is exposed as surface atoms where the reaction can take place. The present invention is concerned with alumina, as a support material.

Supported cobalt catalysts are the preferred catalysts for the FT synthesis. The most important properties of a cobalt FT catalyst are the activity, the selectivity usually to $C_{5+}$ and heavier products and the resistance towards deactivation. Known catalysts are typically based on titania, silica or alumina supports and various metals and metal oxides have been shown to be useful as promoters.

In a paper by Iglesia et al. ["Selectivity Control and Catalyst Design in the Fischer-Tropsch Synthesis: Sites, Pellets and Reactors" Advances in Catalysis, Vol 3, 1993] a Thieles modulus is defined as a product of two components, $\Psi_n$ and $\chi$, where $\Psi_n$ depends only on the diffusivity and reactivity of the individual molecules, whereas $\chi$ depends only on the physical properties and site density of the catalyst. They have described a model whereby the selectivity to $C_{5+}$ products can be described as a volcano plot in terms of $\chi$. The structural parameter is given as:

$$\chi = R_o^2 \Phi \theta_m / r_p,$$

where $\theta_m$ is the site density, e.g. as the number of surface atoms of Co metal atoms per $cm^2$ of pore area in the catalyst particle, Ro is the diffusion length, i.e. the radius of an essentially spherical catalyst particle, $\Phi$ is the porosity of the particle ($cm^3$ pore volume/$cm^3$ particle volume) and $r_p$ is the mean pore radius.

This expression suggests that $\chi$ only depends on universal constant, characteristic data for cobalt in the catalyst as well as the size and density of the catalyst particles. It is particularly significant that $\chi$ does not depend on the pore radius, $r_p$. However, it now appears that the selectivity of the Fischer-Tropsch reaction to $C_{5+}$ products indeed does in fact depend on the pore size.

In a paper by Saib et al. ["Silica supported cobalt Fischer-Tropsch catalysts: effect of pore diameter of support" Catalysis Today 71 (2002) 395-402], the influence of the effect of the average pore diameter of a silica support on the properties of a cobalt catalyst and their performance in F-T synthesis is discussed. The article concludes that the support pore diameter has a strong effect on cobalt crystallite size with larger crystallites forming in larger pore sizes. Also, the activity was found to be a function of the metal dispersion and the maximum $C_{5+}$ selectivity a function of the conversion.

In EP 1 129 776 A1 it is argued that internal diffusion phenomena in a catalyst particle depend on the chemical and morphological structure of the catalyst (pore dimensions, surface area, density of the active sites) and on the molecular dimensions of the species in question. This is a general teaching found in relevant textbooks, e.g. expressed in terms of the Thiele modulus, and it is significant that the pore dimension, i.e. the pore radius or diameter is one of the critical parameters. Further, it is taught that for the Fischer-Tropsch synthesis, interparticle diffusion will create low concentrations of CO towards the centre of the particle with a consequent progressive rise in the $H_2$/CO ratio inside the catalyst and that this condition favours the formation of light hydrocarbons (lower a-value and C5+ fraction). On the other hand, it is stated that multiphase reactors of the slurry type generally use small catalyst particles (20-150 mm) which do not give internal diffusion problems, and more specifically that for catalysts based on differently supported cobalt used in the Fischer-Tropsch synthesis, it is possible to neglect internal diffusion limitations by operation with particles having diameter of less than 200 mm.

In EP 0 736 326 B1, it is shown that the C5+ selectivity can increase over a certain range of increasing pore size for a cobalt on alumina type FT catalyst. However, no reference or details of the method of measuring pore size is given, and it is well known that reported values vary significantly with method, e.g. for different probe gases or whether adsorption or desorption isotherms are employed.

In general, after impregnation of an alumina carrier with a solution of a cobalt catalyst material, the carrier is dried and calcined at a relatively low temperature of 200 to 450° C., e.g. at 300° C., for 2 to 16 hours. However, it is known that prolonged calcination at higher temperatures, e.g. above 500° C. can reduce catalyst activity.

This is in the first instance due to agglomeration of Co crystallites giving a reduced Co surface area for the FT-reaction, but at higher temperatures Co reacts with the alumina itself to form an inactive spinel phase, cobalt aluminate $CoAl_2O_4$. Transformation to cobalt aluminate was demonstrated by Davis and co-workers (Applied Catalysis, Volume 247, Pages 335-343, 2003) to occur at 650° C. and to transform completely at 850° C. The present invention relates to the surprising beneficial effect of high temperature treatment of an impregnated catalyst carrier on its attrition level.

SUMMARY OF THE INVENTION

According to one aspect of the invention, there is provided a method of producing an alumina-supported catalyst, which comprises the following steps: a first impregnation step in which an initial alumina support material is impregnated with a source of a 2-valent metal capable of forming a spinel compound with alumina; a first calcination step in which the impregnated alumina support material is calcined at a temperature of at least 550° C. to produce a modified alumina support material; a second impregnation step in which the modified alumina support material is impregnated with a source of catalytically active metal; and a second calcination step in which the impregnated modified support material is calcined at a temperature of at least 150° C.

According to another aspect of the invention, there is provided a method for the production of an alumina support for a catalyst, which comprises impregnating an initial alumina support material with a source of a 2-valent metal capable of forming a spinel compound with alumina, and calcining the impregnated alumina at a temperature of at least 550° C.

The invention also extends to catalyst material made in accordance with the first aspect and a support material made in accordance with the second aspect.

The invention also extends to the use of the support material and the use of the catalyst in an F-T synthesis.

The F-T synthesis may be conducted in a fixed bed reactor or a non-fixed bed reactor, such as a slurry bubble column.

The invention also extends to a process for the production of hydrocarbons which comprise subjecting $H_2$ and CO gases to a Fischer-Tropsch synthesis reaction in a reactor in the presence of a catalyst of the invention. The process can be conducted under typical F-T operating conditions. The products can be subjected to various post-processing operations, such as de-waxing, hydro-isomerisation and/or hydro-cracking.

DETAILED DESCRIPTION OF THE PREFERRED EMBODIMENTS

Amorphous catalyst support materials typically have specific surface areas between 50 and 500 $m^2/g$, more typically between 100 and 300 $m^2/g$. The starting alumina materials used in the present invention are all, at least predominantly, of the γ-alumina type, preferably with specific surface areas between 150 and 200 $m^2/g$. These supports can be prepared by spray-drying techniques of an appropriate solution in order to obtain essentially spherical particles of appropriate size, e.g. 80% in the range between 30-120 μm. After spray-drying, the material is calcined at a high temperature to give the appropriate crystal size and pore structure.

It is also important that the total pore volume is sufficiently high, above 0.2 $cm^3/g$ or better, above 0.4 $cm^3/g$, or even above 0.6 $cm^3/g$. The pore volume is often measured by the BET method applying nitrogen as the adsorption gas. This method does not take into account large pores where a mercury porosimeter is more relevant. A less accurate, but more practical parameter is the measured water absorbtivity, which can be directly correlated with the amount of cobalt that can be impregnated on the catalyst by the incipient wetness procedure. A high pore volume will give a light material suitable for operation in a slurry environment and ease the impregnation by minimising the number of impregnation steps required. At the same time the support, and the final catalyst, should have sufficient strength for extended operation of months and years with minimal attrition of the materials. This can be tested in a slurry environment or by the ASTM method applicable for testing FCC (fluid catalytic cracking) catalysts.

The properties of γ-alumina catalyst support materials have been investigated, both as received from the alumina vendor (Sasol GmbH of Hamburg, Germany), and following heat treatment. The properties are set out in Table 1.

TABLE 1

Properties of alumina as received and heat treated.

| Alumina batch no. | Calcination temperature [° C.] | Surface area [$m^2/g$] | Pore volume ($N_2$) [ml/g] | Pore diameter [nm] | Attrition [g/50 g at 5 h] | Water abSorbtivity [ml/g]** | α-alumina [%] |
|---|---|---|---|---|---|---|---|
| Al-1 | 500* | 191 | 0.721 | 11.4 | 4.9 | 1.23 | 0 |
| " | 1100 | 55 | 0.390 | 22.0 | 7.0 | 0.85 | 17 |
| " | 1130 | 15 | 0.084 | 20.4 | 15.2 | 0.69 | 85 |
| " | 1150 | 7 | 0.019 | 11.4 | 39.0 | 0.60 | |
| Al-2 | 500* | 170 | 0.734 | 12.9 | 4.8 | 1.30 | 0 |
| " | 900 | 107 | 0.684 | 19.1 | 4.9 | 1.15 | |
| " | 1100 | 56 | | | 6.9 | 0.85 | |
| " | 1130 | 18 | 0.108 | 22.2 | | 0.75 | 87 |
| " | 1140 | 10 | 0.049 | 18.3 | 26.3 | 0.71 | 97 |
| " | 1140 | 7 | 0.026 | 14.8 | 26.0 | 0.74 | 100 |

*Equivalent to "as received" material. The average particle size is respectively 62 μm and 59 μm.
**The water absorbtivity is determined as the "incipient wetness" point by successively adding water to the point where water is visually released from the pores of the alumina by gentle tapping of the beaker containing the material.

The as received γ-alumina materials from the alumina vendor have been treated in one or both of two ways, namely, further heat treatment/calcinations at temperatures in the range 500-1200° C.; and impregnation by one or a mixture of substances followed by heat treatment in the 700-1300° C. temperature range. The properties of the resulting materials have been investigated.

Upon high temperature treatment, the γ-aluminas or the different alumina hydrates will be converted to transition phase aluminas, denoted δ, θ, η, χ or κ-aluminas, that all finally will be converted to α-alumina, with a gradual decrease in specific surface areas. These aluminas may also be suitable as support materials for cobalt for the Fischer-Tropsch synthesis, even though this may have specific surface areas in the range 10-50 $m^2/g$. The specific surface areas and pore volumes must be balanced towards the requirements for sufficiently high cobalt metal loading and dispersion. However, it is also possible to increase the high temperature surface stability of aluminas by adding certain stabilising agents like lanthanum (lanthanum oxide). In this way, the γ-phase can be retained, even above 1000° C. Other stabilising agents have been used, such as magnesia and ceria.

Three other properties are important for the support, and for the final catalyst, in particular when used in a slurry reactor environment such as a slurry bubble column. These are the particle density, the particle size, and the abrasion or attrition resistance. The density is important in order to achieve a suitable distribution (dispersion) of the catalyst particles in the reactor. A light material is particularly advantageous for avoiding catalyst settling or an excessive concentration of particles in the lower part of the reactor. The particle size also affects settling and the catalyst concentration profile, but should not be excessively small, since this makes separation of the liquid product from the reactor slurry more difficult and increases the incidence of particles being transported with the gas phase at the top of the reactor. Attrition should be minimised to prolong the life of the catalyst and to avoid contamination of the liquid hydrocarbon product.

Examples of these parameters for selected γ-alumina supports and their heat-treated analogues are given in Table 1. As can be seen, there is a clear tendency for the attrition resistance to diminish significantly as the calcination temperature exceeds 1100° C. simultaneously with an increase of the α-alumina content. It is stated in WO 02/47816 that catalysts with low surface areas and/or high α-alumina contents lead to a significant increase in the selectivity to the desired C5+ products in the FT-synthesis. As seen, however, the pore volume is reduced and attrition can reach an unacceptable level.

As mentioned above, an important method for characterisation of the present catalysts and support materials is related to the determination of the pore characteristics; pore volume, pore size distribution, surface area and average pore size. Various techniques may be applied, but most are variations of the so-called BET method using the adsorption or desorption isotherms of a gas that is adsorbed to the surface of the pores, typically nitrogen, but also certain noble gases or mercury are used for specialised purposes. In the present invention, the nitrogen desorption isotherm is used, measured by standard procedures on an ASAP 2000 instrument from Micromeretics and the standard included software for calculation of the pore characteristics.

The values reported in the Tables in this specification are the BET surface area, the BJH desorption cumulative pore volume between 17 and 3000 A diameter and the BJH desorption average pore diameter (4 V/A). Specific values will vary depending on the method, but the general findings are expected to be valid independent of the method employed, and characterisation data compared therefore should be harmonised to a given method.

The modified ASTM type equipment for testing attrition consists of two main parts, one air feeding system and one reactor where the attrition takes place. Compressed air passes through a pressure regulator (5 bar) to a moisture chamber where the air is moistened to approximately 30% relative moisture. This is done to avoid static electricity in the system. The amount of air is then adjusted in a mass flow controller. The humid air then enters the reactor through a sieve tray where the holes have a diameter of 0.4 mm. Because of these holes, the gas reaches sonic velocity, which causes the "wear and tear" on the particles in the reactor. The reactor has an internal diameter of 35.6 mm (1.4 inches) and a length of 711 mm (28 inches) and the pressure is approximately 1.8 bar. After passing through the reactor, the velocity is lowered in a separation chamber which has an internal diameter of 112 mm (4.4 inches) and a length of 305 mm (12 inches). There is a conical connection 203 mm long (8 inches) between the reactor and the separation chamber.

Particles >40 μm will fall back down into the reactor, while smaller particles <40 μm (fines) will enter a Soxhlet-filter through a u-formed tubing, connected to the separation chamber via a conical connection 106 mm long (4 inches). A vibrator is mounted on the separation chamber, to loosen any particles on the inside walls.

50 g of powder or catalyst, sieved to >40 μm before testing, is loaded to the reactor, and the reactor is connected to the separation chamber. The air is turned on, and the fines produced in the reactor and collected in the Soxhlet filter are weighed every 15 minutes during the first 2 hours, and every 30 minutes during the next 3 hours. A normal run lasts 5 hours and the amount of fines produced can be plotted against time.

Support Modification and Catalyst Preparation

TABLE 2

Properties of alumina modified by metal salt impregnation and high-temperature treatment.

| Impregnated metal and level [wt %]* | Calcination temperature [° C.] | Surface area [m²/g] | Pore volume (N₂)ml/g] | Pore diameter [nm] | Attrition [g/50 g at 5 h]** | α-alumina [%]*** | Water absorbtivity (ml/g) |
|---|---|---|---|---|---|---|---|
| 5 Co | 900 | 107 | 0.62 | 18 | 4.3 | | 1.00 |
| " | 1050 | 44 | 0.30 | 23 | 4.6 | | 0.74 |
| " | 1100 | 12 | 0.07 | 23 | 12 | | 0.61 |
| " | 1140 | 9 | 0.05 | 22 | 20 | | |
| 10 Co | 900 | 100 | 0.61 | 18 | 4.5 | | 1.00 |
| " | 1050 | 47 | 0.34 | 24 | 4.8 | | 0.70 |
| " | 1100 | 14 | 0.15 | 40 | 5.5 | | 0.54 |
| " | 1140 | 10 | 0.09 | 33 | 6.9 | | 0.50 |
| 20 Co | 300 | 144 | 0.49 | 11 | 6.8 | | 0.92 |
| " | 900 | 76 | 0.47 | 20 | 7.0 | 0 | 0.90 |
| " | 1140 | 10 | 0.09 | 33 | 3.4 | 12 | 0.47 |
| 10 Al | 900 | 90 | 0.42 | 14 | 8.8 | | 1.12 |
| " | 1050 | 55 | 0.34 | 18 | 5.0 | | 0.80 |
| " | 1140 | 6 | 0.02 | 15 | 28.0 | | 0.78 |
| 10 Zn | 1120 | 17 | 0.16 | 36 | 10.5 | 54 | 0.57 |
| " | 1140 | 12 | 0.13 | 38 | 6.9 | 63 | 0.56 |
| " | 1160 | 11 | 0.11 | 37 | 6.9 | 64 | 0.53 |
| 12.5 Zn | 1140 | 14 | 0.16 | 39 | 4.6 | | 0.52 |
| 15 Zn | 1140 | 13 | 0.15 | 42 | 3.4 | | 0.47 |
| 5 Mg | 1140 | 17 | 0.16 | 32 | 3.0 | | 0.56 |
| 10 Mg | 1120 | 36 | 0.21 | 18 | | | 0.57 |
| " | 1140 | 29 | 0.18 | 19 | 0.3 | 21 | 0.51 |
| " | 1160 | 16 | 0.12 | 22 | 0.5 | 37 | 0.41 |

TABLE 2-continued

Properties of alumina modified by metal salt impregnation and high-temperature treatment.

| Impregnated metal and level [wt %]* | Calcination temperature [° C.] | Surface area [m²/g] | Pore volume (N₂)ml/g] | Pore diameter [nm] | Attrition [g/50 g at 5 h]** | α-alumina [%]*** | Water absorbtivity (ml/g) |
|---|---|---|---|---|---|---|---|
| 5 Mg + 5 Zn | 1140 | 15 | 0.14 | 32 | 0.5 | | 0.70 |
| 10 Mn | 1140 | 3 | 0.01 | 12 | 16.4 | | 0.53 |
| 3 Ni | 1140 | 9 | 0.07 | 28 | 6.2 | | 0.50 |
| 5 Ni | 1140 | 13 | 0.10 | 27 | 3.6 | 78 | 0.5 |
| " | 1150 | 10 | 0.09 | 33 | | | 0.5 |
| " | 1160 | 8 | 0.04 | 20 | | | 0.5 |
| " | 1170 | 9 | 0.06 | 27 | | | 0.5 |
| " | 1180 | 8 | 0.05 | 21 | 3.0 | | 0.45 |
| 5 Ni** | 1140 | 18 | 0.15 | 29 | 2.9** | | 0.50 |
| 7.5 Ni** | 1120 | 31 | 0.21 | 19 | 1.4** | 37 | 0.51 |
| 7.5 Ni | 1140 | 20 | 0.17 | 28 | 2.8 | 57 | 0.51 |
| 10 Ni | 900 | 93 | 0.38 | 14 | | | |
| 10 Ni | 1140 | 18 | 0.165 | 30 | 1.5 | | 0.45 |

Al-2 is the starting material.
*Nominal values assuming complete reduction to metal. Note that the samples here all are in oxide form.
**Bold face signifies lower attrition than the alumina carrier calcined at the same temperature.
***Simplified estimation from peak heights of most intense peak for each compound in standard Cu-XRD. The other XRD peaks for the samples calcined at 1140° C. correspond to the MeAL₂0₄ spinel.
****On Al-1 type alumina.

From Table 2 it can be seen that a standard catalyst in calcined form, (the 20 Co/300° C. sample), has an attrition level higher than the support material, that is to say, 6.8 g compared to 4.8 g. In other words, a significant reduction in strength is observed by impregnation of cobalt nitrate and standard calcination. What has now been astonishingly found is that the strength increases significantly by further calcination to 1140° C. (3.4 g), an attrition level which is actually lower than for the starting alumina material. The comparison is even more compelling with the alumina support calcined at the same temperature (1140° C.), as most of the strength then is lost (26.3 g). The positive effect on the catalyst strength increases with calcination temperature and Co loading.

For comparison, impregnation of aluminium nitrate was attempted, but it can be seen that little effect on the attrition was gained as in fact the attrition level of 28.0 g for the impregnated sample is slightly above the 26.3 g obtained for the support, both calcined at 1140° C. On the other hand, Zn has a positive effect on attrition, very much in line with Co. It therefore seems as if impregnation with a metal salt and high temperature calcination enhances the strength of alumina if the added metal is able to form a well defined crystalline mixed oxide with aluminium, in this case a spinel with composition MeAl₂O₄, Me being a 2-valent metal. An even stronger effect is found using an Mg salt, as an extremely strong material is formed. The attrition level after 5 h in a jet cup of 0.5% is below anything seen for a catalyst or catalyst support. The origin of the effect can only be speculative, but it would seem that the magnesium ion is smaller than $Co^{2+}$ or $Zn^{2+}$ and therefore may exhibit higher solid-state diffusion rates at the given temperature. This points to a possible positive effect of modifying alumina with other metal salts/oxides containing small metal ions, like lithium. Nevertheless, it was surprisingly found that nickel gives a very attrition resistant modified alumina support, approaching the values for magnesium (FIG. 1).

Unless otherwise stated, all the catalysts used contain a nominal amount of cobalt of 20 wt % and 0.5 wt % Re, calculated assuming reduced catalysts with complete reduction of cobalt.

The actual metal loading as determined by XRF or ICP may vary up to ±10%, i.e. for cobalt between 18 and 22 w % of the total reduced catalyst weight. Other promoters besides rhenium, specifically, platinum, iridium or ruthenium, can be employed. It is also possible to add a second promoter such as lanthanum oxide or a mixture of oxides of the lanthanides or other compounds which are difficult to reduce.

Before impregnation, the catalyst support may be precalcined at about 500° C. Impregnation is usually in one step, but multiple steps can also be employed, from a mixed aqueous solution of appropriate metal salts, generally of cobalt nitrate and perrhenic acid or alternatively ammonium perrhenate. The impregnation technique generally used is the pore filling or "incipient wetness" method, in which the solution is mixed with the dry support until the pores are filled. The definition of the end point of this method may vary somewhat from laboratory to laboratory so that an impregnated catalyst could have a completely dry appearance or a sticky snow-like appearance. However, in no instances are there are any free flowing liquid present.

A number of alternative impregnation procedures are known in the art which use alternative solvents and chemicals, however, in the present invention, the preferred procedure involves aqueous incipient wetness with solutions of cobalt nitrate $(Co(NO_3)_2*6H_2O)$ and perrhenic acid $(HReO_4)$. Possible alternatives include using cobalt acetate(s), cobalt halide(s), cobalt carbonyl(s), cobalt oxalate(s), cobalt phosphate(s), organic cobalt compounds, ammonium perrhenate, rhenium halide(s), rhenium carbonyl(s), industrial metal salt solutions, organic solvents, etc. Furthermore, the impregnation technique may encompass all available methods besides incipient wetness, such as precipitation, impregnation from slurry with surplus liquid, chemical vapour deposition etc. It is well known that the impregnation method may influence the dispersion of the active metal (cobalt) and hence the catalytic activity, but as the Fischer-Tropsch reaction is believed to be non-structure sensitive, dispersion should not influence the selectivity The impregnated catalyst is dried, typically at 80-120° C., to remove water from the catalyst pores, and then calcined at typically 200-450° C., e.g. at 300° C. for 2-16 h.

Catalyst Testing

One critical step before testing is the activation of the catalyst that involves reduction of cobalt oxide(s) to cobalt metal. This reduction can be performed by flowing a suitable reductive gas over the catalyst particles. Particularly suitable are hydrogen or carbon monoxide or mixtures thereof. The reductive gas can be mixed with inerts like nitrogen, noble gases or steam and suitable temperatures and pressures should be applied. If a fluidised bed reactor is used for activation, it may be convenient to use a recycle of (part of) the reductive gas and a slight atmospheric total overpressure in order to achieve a suitable gas flow. It is also possible to use elevated total pressures, e.g. up to 8 bar or higher, or even the Fischer-Tropsch reactor pressure. Selection of the reduction temperature strongly depends on the actual catalyst formulation, in particular on the presence and nature of promoters. It is well known that Re is highly efficient as a promoter in achieving high reducibilities at a conveniently reduced temperature.

Some fixed-bed testing of activated catalysts has been performed in a laboratory unit with four parallel fixed-bed reactors. About 1 g of catalyst particles in a controlled size fraction was mixed with 5 times the volume of inert SiC. Reduction was performed in situ with hydrogen before an approximate 2:1 mixture of hydrogen and CO was carefully added. After 20 h on stream at 210° C. and 20 bar total pressure, the space velocity was adjusted to give an estimated conversion level of CO after 90 h of between 45 and 50%. It is of utmost importance to perform selectivity comparisons, as well as activity comparisons, at the same conversion level, since the level of steam generated in the reaction has a profound influence on catalyst performance.

TABLE 3

Catalyst performance in the Fischer-Tropsch reaction.

| Modified alumina support Al-2 [metal impr. wt %/ calc. Temp. ° C.] | Catalyst impregnation. Composition [wt %/wt %] | Relative activity | Relative $C_{5+}$ selectivity | Attrition resistance of support |
|---|---|---|---|---|
| —/500 | 20Co/0.5Re | 1.54 | 0.933 | Good |
| —/900 | 20Co/0.5Re | 1.46 | 0.930 | Good |
| —/1100 | 20Co/0.5Re | 1.53 | 0.945 | |
| —/1130 | 20Co/1Re | 1.02 | 0.991 | |
| —/1140 | 20Co/0.5Re | 0.75 | 0.988 | Very low |
| —/1140 | 20Co/0.25Re | 0.83 | 0.972 | Very low |
| 5Co/900 | 20Co/0.5Re | 1.68 | 0.938 | Good |
| 5Co/900 | 20Co | 1.27 | 0.914 | Good |
| 5Co/1050 | 20Co/0.5Re | 1.56 | 0.950 | Good |
| 5Co/1050 | 20Co | 1.10 | 0.945 | Good |
| 10Co/900 | 20Co/0.5Re | 1.50 | 0.941 | Good |
| 10Co/900 | 20Co | 1.14 | 0.927 | Good |
| 10Co/1050 | 20Co/0.5Re | 1.37 | 0.961 | Good |
| 10Co/1050 | 20Co | 0.82 | 0.956 | Good |
| 20Co/900 | 20Co/0.5Re | 1.73 | 0.952 | Acceptable |
| —/500 | 12Co/0.5Re | 0.92 | 0.931 | Good |
| —/1130 | 12Co/1Re | 1.05 | 0.987 | Low |
| —/1140 | 12Co/1Re | 0.66 | 1.007 | Very low |
| 5Co/1100 | 12Co/0.5Re | 0.91 | 0.985 | Low |
| 10Co/1100 | 12Co/0.5Re | 0.83 | 0.989 | Good |
| 10Co/1140 | 12Co/0.5Re | 0.69 | 0.990 | Acceptable |
| 10Co/1140 | 12Co | 0.54 | 0.977 | Acceptable |
| 20Co/1140 | 12Co/0.5Re | 0.44 | 0.986 | Very good |
| 10Al/1050 | 20Co/0.5Re | 1.37 | 0.953 | Good |
| 10Al/1050 | 20Co | 0.58 | 0.946 | Good |
| 10Zn/1120 | 24Co/1Re | 1.32 | 0.974 | Low |
| 10Zn/900 | 20Co/0.5Re | 1.48 | 0.922 | |
| 10Zn/1120 | 12Co/0.5Re | 0.95 | 0.975 | Low |
| 10Zn/1140 | 12Co/0.5Re | 0.86 | 0.987 | Acceptable |
| 10Zn/1140 | 12Co/0.25Re | 0.84 | 0.979 | Acceptable |
| 10Zn/1140 | 12Co | 0.68 | 0.963 | Acceptable |
| 10Zn/1160 | 12Co/0.5Re | 0.82 | 0.985 | Acceptable |
| 12.5Zn/1140 | 12Co/0.25Re | 0.67 | 0.977 | Good |
| 15Zn/1140 | 12Co/0.5Re | 0.76 | 0.984 | Very good |
| 10Mg/1140 | 24Co/1Re | 0.64 | 0.932 | Extremely good |
| 5Mg/1140 | 12Co/0.5Re | 0.48 | 0.979 | Very good |
| 10Mg/1120 | 12Co/0.5Re | 0.53 | 0.954 | |

TABLE 3-continued

Catalyst performance in the Fischer-Tropsch reaction.

| Modified alumina support Al-2 [metal impr. wt %/ calc. Temp. ° C.] | Catalyst impregnation. Composition [wt %/wt %] | Relative activity | Relative $C_{5+}$ selectivity | Attrition resistance of support |
|---|---|---|---|---|
| 10Mg/1140 | 12Co/0.5Re | 0.38 | 0.952 | Extremely good |
| 10Mg/1160 | 12Co/0.5Re | 0.25 | 0.928 | |
| 5Mg + 5Zn/1140 | 12Co/0.5Re | 0.44 | 0.972 | Extremely good |
| 3Ni/1140 | 12Co/0.5Re | 0.66 | 0.991 | Acceptable |
| 5Ni/1140 | 12Co/0.5Re | 0.89 | 0.989 | Very good |
| 5Ni/1150 | 12Co/0.5Re | 0.87 | 0.980 | |
| 5Ni/1160 | 12Co/0.5Re | 0.75 | 0.992 | |
| 5Ni/1170 | 12Co/0.5Re | 0.62 | 0.983 | |
| 5Ni/1180 | 12Co/0.5Re | 0.66 | 0.992 | Very good |
| 5Ni*/1140 | 12Co/0.25Re | 0.73 | 0.970 | Very good |
| 7.5Ni*/1120 | 12Co/0.5Re | 1.04 | 0.957 | Extremely good |
| 7.5Ni/1140 | 12Co/0.25Re | 0.74 | 0.965 | Very good |
| 10Ni/900 | 12Co/0.5Re | 1.48 | 0.906 | |
| 10Ni/1140 | 12Co/0.25Re | 0.78 | 0.973 | Extremely good |

*On Al-1 type alumina.

In Table 3 the first column relates to the first impregnation and calcination, showing the impregnated metal (with "—" indicating no impregnation) and the temperature of calcination. The second column relates to the second impregnation (with cobalt) and calcination, showing the cobalt and rhenium contents. Calcination was carried out at about 300° C.

From Table 3 it is clear that heat treatment of the Al-2 support at 900° C. or above, and particularly above 1100° C., increases the selectivity of the catalyst, as also described in the present Applicants' WO 02/47816. It would seem that the same effect is seen for all modified aluminas that have been impregnated with a metal solution and then high temperature treated before standard impregnation and calcination. It should also be noted that the addition of Rhenium gives improved activity and selectivity for all catalysts in accordance with previous reports. Thus the present invention means that it now is possible to combine high selectivity with high strength of the catalyst particles.

There are, however, some differences between the 2-valent modifiers that have been applied. As it is desirable to use as little modifier as possible, values can e.g. be compared for the same wt % of the added 2-valent modifier before calcination at 1140° C. First it can be noted that at the 10 wt % level only magnesium and nickel is able to give an attrition classified as "good" or better, and that this classification even is maintained for a 5 wt % loading. However, magnesium gives a clearly inferior catalytic performance, whereas 5 wt % nickel shows excellent activity and selectivity. A particular feature can be observed in the pore size distribution diagram of the catalysts (FIG. 2), or the modified supports, plotted as differential pore volume as a function of pore diameter from the BET measurements with nitrogen. The pore size distribution of the Al-2 is bimodal, but the degree of bimodality decreases with calcination temperature of the modified support, concurrent with enhancement of strength and C530 selectivity.

Figure 1:
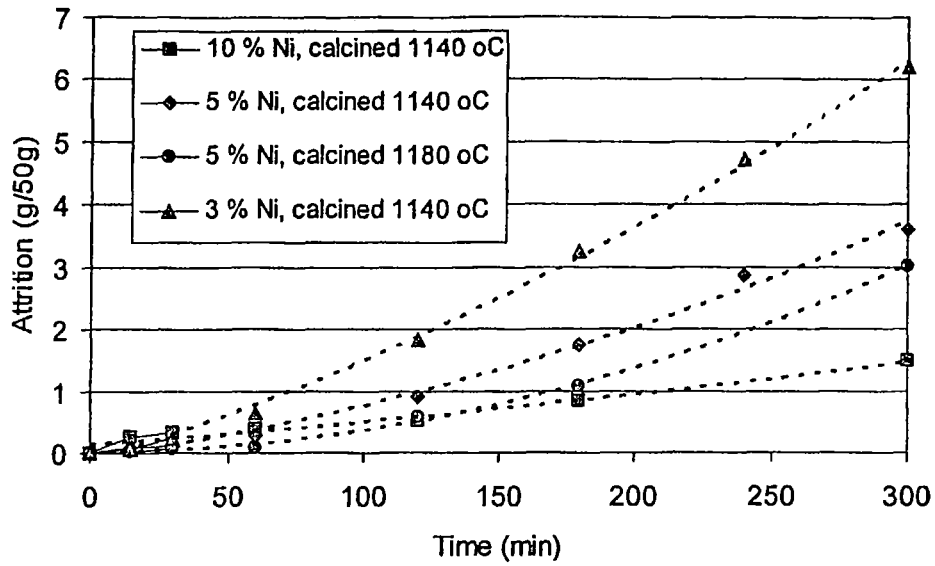
FIG. 1 shows the effect of Ni loading and calcination temperature on the strength of modified Al-2 supports.
Figure 2:
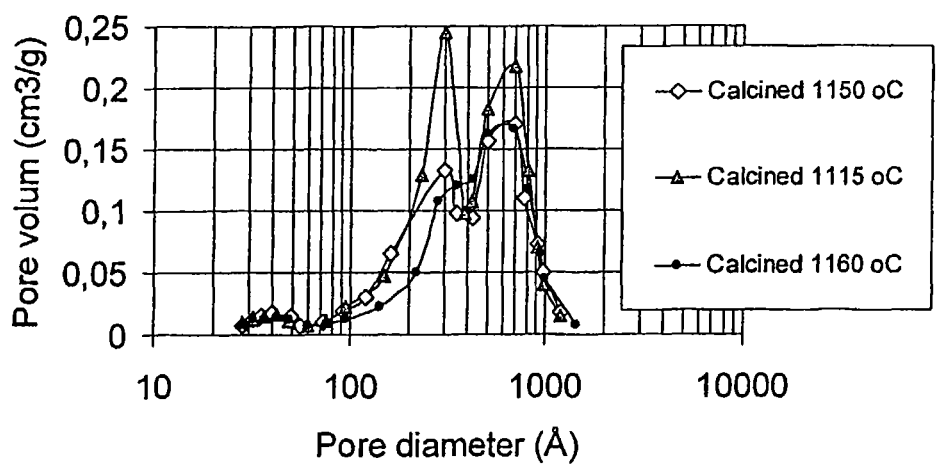
FIG. 2 shows temperature effect on the pore size distribution of catalysts employing the modified catalyst supports, prepared by high temperature calcination of 5 wt % Ni as nickel nitrate impregnated on γ-alumina.

The invention claimed is:

1. A method for the production of hydrocarbons, comprising:
   impregnating an initial alumina support material with a source of a 2-valent metal capable of forming a spinel compound with alumina to produce an impregnated alumina support material;
   calcining the impregnated alumina support material at a temperature of at least 800° C. to produce a modified alumina support material, the modified alumina support material comprising the spinel compound;
   impregnating the modified alumina support material with a source of catalytically active metal to produce an impregnated modified alumina support material;
   calcining the impregnated modified alumina support material at a temperature of at least 150° C. to produce an alumina-supported catalyst; and
   subjecting $H_2$ and CO gases to a Fischer-Tropsch synthesis reaction in a reactor in the presence of the alumina-supported catalyst.

2. The method of claim 1, further comprising:
   activating the alumina-supported catalyst.

3. The method of claim 1, wherein the Fischer-Tropsch synthesis reaction comprises a three-phase reaction, said $H_2$ and CO being gaseous, the alumina-support catalyst being a solid and the hydrocarbons being at least partially liquid.

4. The method of claim 1, wherein the reactor comprises a slurry bubble column reactor.

5. The method of claim 4, further comprising:
   supplying the $H_2$ and CO gases to a slurry in the slurry bubble column reactor, the slurry comprising the alumina-supported catalyst in suspension in a liquid including the reaction products of the $H_2$ and CO gases, the alumina-supported catalyst being maintained in suspension in the slurry at least partly by the motion of the $H_2$ and CO gases supplied to the slurry.

6. The method of claim 1, further comprising:
   maintaining a reaction temperature of the Fischer-Tropsch synthesis reaction in the range 190-250° C.

7. The method of claim 6, wherein the reaction temperature is maintained in the range 200-230° C.

8. The method of claim 1, further comprising:
   maintaining a reaction pressure of the Fischer-Tropsch synthesis reaction in the range 10-60 bar.

9. The method of claim 8, wherein the reaction pressure is maintained in the range 15 to 30 bar.

10. The method of claim 1, further comprising:
    supplying the $H_2$ and CO gases to the Fischer-Tropsch synthesis reactor in a $H_2$/CO ratio in the range 1.1 to 2.2.

11. The method of claim 10, wherein the $H_2$/CO ratio is in the range 1.5 to 1.95.

12. The method of claim 1, further comprising:
    maintaining a superficial gas velocity in the reactor in the range 5 to 60 cm/s.

13. The method of claim 12, wherein the superficial gas velocity is in the range 20 to 40 cm/s.

14. The method of claim 1, further comprising:
    subjecting a product of the Fischer-Tropsch synthesis reaction to post-processing.

15. The method of claim 14, wherein the post-processing is selected from the group consisting of: de-waxing, hydro-isomerization, hydro-cracking and combinations thereof.

16. The method of claim 1, wherein the modified alumina support material contains spinel structures having a formula corresponding to $MeAl_2O_4$ in which Me comprises a 2-valent metal.

17. The method of claim 1, wherein the step of calcining the impregnated alumina support material to produce the modified alumina support material occurs at the temperature of at least about 850° C. to about 1300° C.

18. The method of claim 1, wherein the initial alumina support material comprises γ-alumina.

19. A method of producing hydrocarbons, comprising:
    subjecting $H_2$ and CO gases to a Fischer-Tropsch synthesis reaction in a reactor in the presence of an alumina-supported catalyst, the alumina-supported catalyst comprising a catalytically active metal and a modified alumina-support material containing an alumina oxide spinel, wherein the catalyst is produced by:
    impregnating an initial alumina support material with a source of a 2-valent metal capable of forming the alumina oxide spinel compound with alumina to produce an impregnated alumina support material,
    calcining the impregnated alumina support material at a temperature of at least 800° C. to produce the modified alumina support material, the modified alumina support material comprising the spinel compound,
    impregnating the modified alumina support material with the catalytically active metal to produce an impregnated modified support material; and
    calcining the impregnated modified support material at a temperature of at least 150° C. to produce the alumina-supported catalyst.

20. The method of claim 19, wherein the initial alumina support material comprises γ-alumina.

* * * * *

UNITED STATES PATENT AND TRADEMARK OFFICE
CERTIFICATE OF CORRECTION

PATENT NO. : 8,952,076 B2  
APPLICATION NO. : 12/582541  
DATED : February 10, 2015  
INVENTOR(S) : Rytter et al.

Page 1 of 1

It is certified that error appears in the above-identified patent and that said Letters Patent is hereby corrected as shown below:

On the title page under item (73) Assignee: insert --Petrosa, Waterfront, South Africa--

Signed and Sealed this  
Twelfth Day of January, 2016

Michelle K. Lee  
*Director of the United States Patent and Trademark Office*